(12) United States Patent
Wiegman

(10) Patent No.: US 11,789,441 B2
(45) Date of Patent: Oct. 17, 2023

(54) SYSTEM AND METHOD FOR DEFINING BOUNDARIES OF A SIMULATION OF AN ELECTRIC AIRCRAFT

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/475,691

(22) Filed: Sep. 15, 2021

(65) Prior Publication Data

US 2023/0078834 A1    Mar. 16, 2023

(51) Int. Cl.
| | | |
|---|---|---|
| *G05D 1/00* | (2006.01) | |
| *G05D 1/10* | (2006.01) | |
| *G08G 5/00* | (2006.01) | |
| *B64D 27/24* | (2006.01) | |

(52) U.S. Cl.
CPC .......... *G05D 1/0011* (2013.01); *B64D 27/24* (2013.01); *G05D 1/005* (2013.01); *G05D 1/101* (2013.01); *G08G 5/0013* (2013.01)

(58) Field of Classification Search
CPC ...... G05D 1/0011; G05D 1/005; G05D 1/101; G05D 1/106; B64D 27/24; G08G 5/006; G08G 5/0013
See application file for complete search history.

(56) References Cited

U.S. PATENT DOCUMENTS

| | | |
|---|---|---|
| 5,420,582 A | 5/1995 | Kubbat |
| 5,920,321 A | 7/1999 | Owen |
| 6,653,947 B2 | 11/2003 | Dwyer |
| 6,696,980 B1 | 2/2004 | Langner |
| 7,010,398 B2 | 3/2006 | Wilkens, Jr. |
| 7,598,888 B2 | 10/2009 | Dwer |
| 7,693,621 B1 | 4/2010 | Chamas |
| 7,869,943 B1 | 1/2011 | Simon |
| 8,140,197 B2 | 3/2012 | Lapidot |
| 8,160,755 B2 | 4/2012 | Nichols |
| 8,339,283 B2 | 12/2012 | Filliatre |
| 8,527,118 B2 | 9/2013 | Jones |
| 8,581,748 B1 | 11/2013 | Barber |

(Continued)

*Primary Examiner* — Nicholas Kiswanto
(74) *Attorney, Agent, or Firm* — Caldwell Intellectual Property Law, LLC

(57) ABSTRACT

The system and method for defining boundaries of a simulation of an electric aircraft is illustrated. The system comprises a sensor, a computing device, and a remote device. The sensor is configured to detect an aircraft location datum, detect a boundary datum associated with a three-dimensional flying space, and transmit the aircraft location datum and boundary datum to a computing device. The computing device is configured to receive the aircraft location datum and boundary datum from the sensor, determine a distance datum between the aircraft location and boundary as a function of the aircraft location datum and boundary datum generate a recommended aircraft adjustment as a function of the distance datum, and transmit the distance datum and recommended aircraft adjustment to a remote device. The remote device is configured to receive the distance datum and recommended aircraft adjustment and display them to a user.

20 Claims, 8 Drawing Sheets

(56) References Cited

U.S. PATENT DOCUMENTS

| | | |
|---|---|---|
| 8,786,633 B2 | 7/2014 | Dairman |
| 8,849,477 B2 | 9/2014 | Brinkman |
| 8,849,483 B2 | 9/2014 | Kuwata |
| 8,965,601 B1 | 2/2015 | Barber |
| 8,983,689 B2 | 3/2015 | Putz |
| 9,014,880 B2 | 4/2015 | Durling |
| 9,020,663 B2 | 4/2015 | Smith |
| 9,086,280 B2 | 7/2015 | Gurusamy |
| 9,117,368 B2 | 8/2015 | Agarwal |
| 9,132,913 B1 | 9/2015 | Shapiro |
| 9,147,349 B2 | 9/2015 | Maddanimath |
| 9,237,313 B2 | 1/2016 | Aspen |
| 9,354,078 B2 | 5/2016 | Burgin |
| 9,405,005 B1 | 8/2016 | Arteaga |
| 9,495,877 B2 | 11/2016 | Duffy |
| 9,728,089 B2 | 8/2017 | Marcus |
| 9,734,723 B1 | 8/2017 | Bruno |
| 9,875,659 B2 | 1/2018 | Feyereisen |
| 10,147,329 B2 | 12/2018 | Liu |
| 10,909,862 B2 | 2/2021 | Robertson |
| 2002/0053983 A1 | 5/2002 | Chamas |
| 2003/0137444 A1 | 7/2003 | Stone |
| 2003/0151630 A1 | 8/2003 | Kellman |
| 2004/0015274 A1 | 1/2004 | Wilkins, Jr. |
| 2005/0200501 A1 | 9/2005 | Smith |
| 2005/0206533 A1 | 9/2005 | Rogers |
| 2006/0265109 A1 | 11/2006 | Canu-Chiesa |
| 2007/0168122 A1 | 7/2007 | Aspen |
| 2007/0235594 A1 | 10/2007 | Wingerr |
| 2008/0142642 A1 | 6/2008 | Marino |
| 2008/0147320 A1 | 6/2008 | Burch |
| 2009/0210109 A1 | 8/2009 | Ravenscroft |
| 2010/0023187 A1 | 1/2010 | Gannon |
| 2010/0145599 A1 | 6/2010 | Wise |
| 2010/0280753 A1 | 11/2010 | Chytil |
| 2010/0292871 A1 | 11/2010 | Schultz |
| 2010/0332056 A1 | 12/2010 | Kirk |
| 2011/0202206 A1 | 8/2011 | Karthikeyan |
| 2011/0231036 A1 | 9/2011 | Yogesha |
| 2012/0194556 A1 | 8/2012 | Schmitt |
| 2013/0138275 A1 | 5/2013 | Nauman |
| 2013/0234884 A1 | 9/2013 | Bunch |
| 2013/0261850 A1 | 10/2013 | Smith |
| 2014/0018979 A1 | 1/2014 | Goossen |
| 2014/0266807 A1 | 9/2014 | Behara |
| 2015/0254988 A1 | 9/2015 | Wang |
| 2015/0325064 A1 | 11/2015 | Downey |
| 2017/0270808 A1* | 9/2017 | Onomura .............. G01S 13/933 |
| 2017/0278404 A1 | 9/2017 | Gordon |
| 2017/0320589 A1 | 11/2017 | Moravek |
| 2017/0357273 A1 | 12/2017 | Michini |
| 2018/0068567 A1* | 3/2018 | Gong ................... G05D 1/106 |
| 2018/0204469 A1 | 7/2018 | Moster |
| 2018/0268721 A1 | 9/2018 | Mccullough |
| 2018/0308367 A1* | 10/2018 | Zhang .................. G08G 5/006 |
| 2020/0143694 A1* | 5/2020 | Kanagarajan ........ G08G 5/0008 |

* cited by examiner

SYSTEM AND METHOD FOR DEFINING BOUNDARIES OF A SIMULATION OF AN ELECTRIC AIRCRAFT

FIELD OF THE INVENTION

The present invention generally relates to the field of electric aircrafts. In particular, the present invention is directed to system and method for defining boundaries of a simulation of an electric aircraft.

BACKGROUND

It can be challenging for pilots to know how close they are to a boundary during flight time or during a flight simulation. Knowing their own distance from the boundary helps the pilot have a safer, smoother, and more informed flight experience without reaching the limits of the area they are flying in.

SUMMARY OF THE DISCLOSURE

In an aspect, the system for defining boundaries of a simulation of an electric aircraft is illustrated. The system comprises a sensor, a computing device, and a remote device. The sensor is configured to detect an aircraft location datum, detect a boundary datum associated with a three-dimensional flying space, and transmit the aircraft location datum and boundary datum to a computing device. The computing device is configured to receive the aircraft location datum and boundary datum from the sensor, determine a distance datum between the aircraft location and boundary as a function of the aircraft location datum and boundary datum generate a recommended aircraft adjustment as a function of the distance datum, and transmit the distance datum and recommended aircraft adjustment to a remote device. The remote device is configured to receive the distance datum and recommended aircraft adjustment and display them to a user.

In another aspect, a method for defining boundaries of a simulation of an electric aircraft is illustrated. The method comprises detecting, at a sensor, an aircraft location datum, detecting, at a sensor, a boundary datum associated with a three-dimensional flying space, transmitting, at a sensor, the aircraft location datum and boundary datum to a computing device, receiving, at a computing device, aircraft location datum and boundary datum from the sensor, determining, at a computing device, a distance datum between the aircraft location and boundary as a function of the aircraft location datum and boundary datum, generating, at a computing device, a recommended aircraft adjustment as a function of the distance datum, transmitting, at a computing device, the distance datum and recommended aircraft adjustment to a remote device, receiving, at a remote device, the distance datum and recommended aircraft adjustment from the computing device, and displaying, at a remote device, the distance datum and recommended aircraft adjustment to a user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to an aircraft with a visual system. In an embodiment, this disclosure includes an aircraft configured to include a fuselage and a plurality of flight components attached to the fuselage. Aspects of the present disclosure include at least an exterior visual device to provide views of the exterior environment of the aircraft. Aspects of the present disclosure include at least a flight controller configured to receive an input from the visual device and display it for the pilot. Exemplary embodiments illustrating aspects of the present disclosure are described below in the context of several specific examples.

Figure 1:
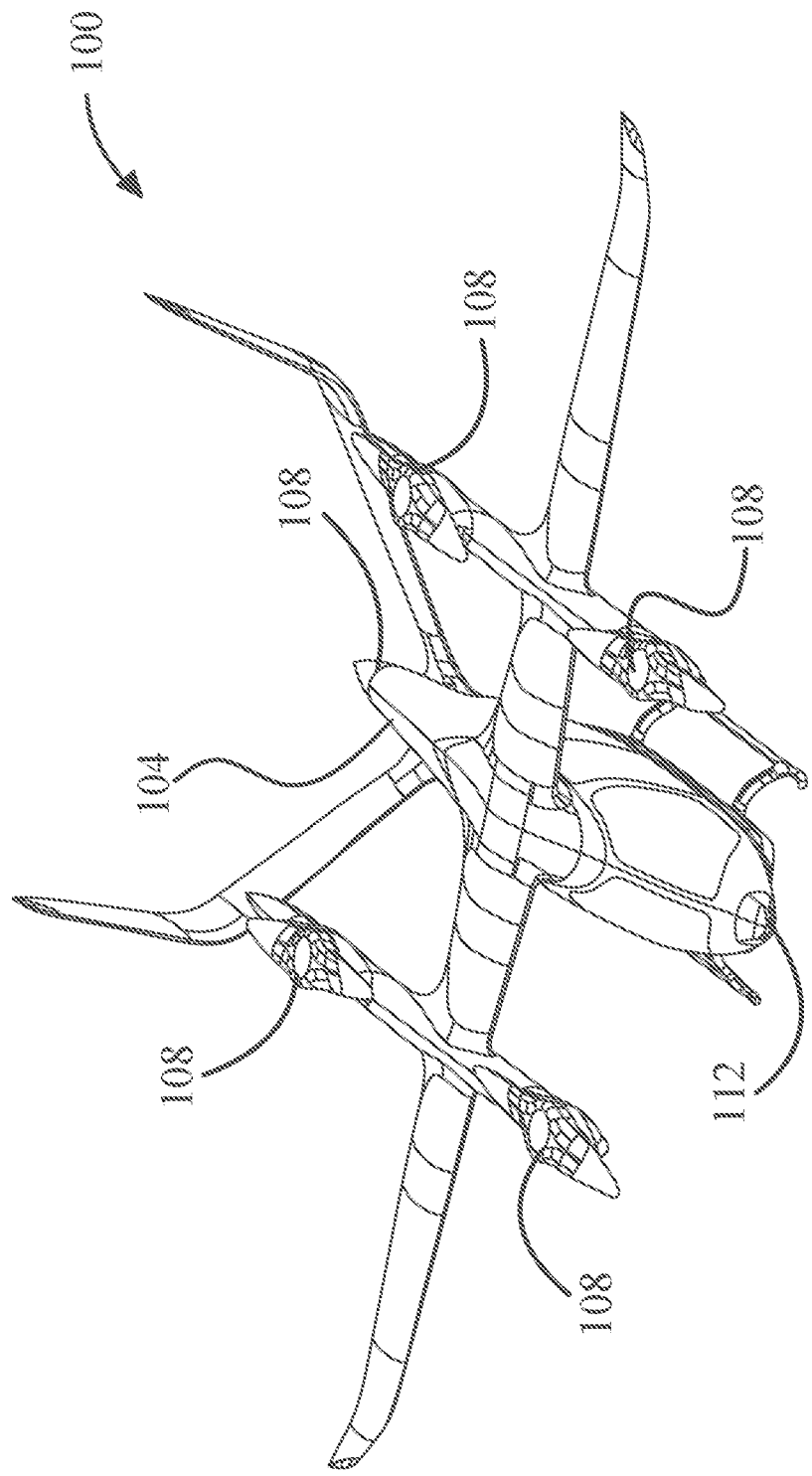
FIG. 1 is a diagrammatic representation of an exemplary embodiment of an electric aircraft.

Referring now to FIG. 1, an exemplary embodiment of an aircraft 100 is illustrated. In an embodiment, aircraft 100 is an electric aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 100 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, filed on Dec. 4, 2019, and entitled "AN INTEGRATED ELECTRIC PROPULSION ASSEMBLY," the entirety of which is incorporated herein by reference.

Still referring to FIG. 1, aircraft 100, may include a fuselage 104, a flight component 108 (or one or more flight components 108), and sensor 112. Sensor 112 is described further herein with reference to FIG. 2.

As used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize power and energy necessary to propel aircraft 100, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where aircraft is capable of flight using wings and/or foils that generate lift caused by the aircraft's forward airspeed and the shape of the wings and/or foils, such as airplane-style flight.

Still referring to FIG. 1, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 104 may include structural elements that physically support a shape and structure of an aircraft. Structural elements may take a plurality of forms, alone or in combination with other types. Structural elements may vary depending on a construction type of aircraft such as without limitation a fuselage 104.

Fuselage 104 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 1, aircraft fuselage 104 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 104 orthogonal to a longitudinal (nose to tail) axis of the aircraft and may form a general shape of fuselage 104. A former may include differing cross-sectional shapes at differing locations along fuselage 104, as the former is the structural element that informs the overall shape of a fuselage 104 curvature. In embodiments, aircraft skin may be anchored to formers and strings such that the outer mold line of a volume encapsulated by formers and stringers may include the same shape as aircraft 100 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may include aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction may include unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 1, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may include aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 104. Monocoque may include only structural skin, and in that sense, aircraft skin undergoes stress by applied aerodynamic fluids imparted by the fluid. Stress as used in continuum mechanics may be described in pound-force per square inch ($lbf/in^2$) or Pascals (Pa). In semi-monocoque construction stressed skin may bear part of aerodynamic loads and additionally may impart force on an underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage 104 may be configurable based on the needs of the eVTOL per specific mission or objective. The general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, aircraft 100 may include a plurality of laterally extending elements attached to fuselage 104. As used in this disclosure a "laterally extending element" is an element that projects essentially horizontally from fuselage, including an outrigger, a spar, and/or a fixed wing that extends from fuselage. Wings may be structures which may include airfoils configured to create a pressure differential resulting in lift. Wings may generally dispose on the left and right sides of the aircraft symmetrically, at a point between nose and empennage. Wings may include a plurality of geometries in planform view, swept swing, tapered, variable wing, triangular, oblong, elliptical, square, among others. A wing's cross section geometry may include an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may include differing and/or similar cross-sectional geometries over its cord length or the length from wing tip to where wing meets aircraft's body. One or more wings may be symmetrical about aircraft's longitudinal plane, which includes the longitudinal or roll axis reaching down the center of aircraft through the nose and empennage, and plane's yaw axis. Laterally extending element may include controls surfaces configured to be commanded by a pilot or pilots to change a wing's geometry and therefore its interaction with a fluid medium, like air. Control surfaces may include flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may include a combination of control surfaces to perform maneuvers while flying or on ground.

Still referring to FIG. 1, aircraft 100 may include a plurality of flight components 108. As used in this disclosure a "flight component" is a component that promotes flight and guidance of an aircraft. In an embodiment, flight component 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 1, plurality of flight components 108 may include at least a lift propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis. The lift propulsor is further described herein with reference to FIG. 2.

In an embodiment, and still referring to FIG. 1, plurality of flight components 108 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

Still referring to FIG. 1, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 100 may be incorporated.

In an embodiment, and still referring to FIG. 1, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 1, plurality of flight components 108 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 100 forward with an equal amount of force. In an embodiment, and without limitation, the more air forced behind aircraft, the greater the thrust force with which aircraft 100 is pushed horizontally will be. In another embodiment, and without limitation, forward thrust may force aircraft 100 through the medium of relative air. Additionally or alternatively, plurality of flight components 108 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 1, aircraft 100 may have a computing device attached. Computing device could include but is not limited to a flight controller, simulation device, and the like. As used in this disclosure a "flight controller" is a computing device of a plurality of computing devices dedicated to data storage, security, distribution of traffic for load balancing, and flight instruction. Computing device may include and/or communicate with any other computing device as described in this disclosure, including without limitation a microcontroller, microprocessor, digital signal processor (DSP) and/or system on a chip (SoC) as described in this disclosure. Further, computing device may include a single computing device operating independently, or may include two or more computing device operating in concert, in parallel, sequentially or the like; two or more computing devices may be included together in a single computing device or in two or more computing devices. In embodiments, computing device may be installed in an aircraft, may control the aircraft remotely, and/or may include an element installed in the aircraft and a remote element in communication therewith. In an embodiment, and without limitation, computing device may be configured to command a plurality of flight components, wherein flight components are described in reference to FIG. 1. Flight controller is described herein more detail in reference to FIG. 3.

Still referring to FIG. 1, aircraft 100 includes sensor 112. As used in this disclosure a "sensor" is a device, module, and/or subsystem, utilizing any hardware, software, and/or any combination thereof to detect events and/or changes in the instant environment and transmit the information. Sensor 112 may be attached via a mechanically and/or communicatively coupled, as described above, to aircraft. For example, and without limitation, sensor 112 may include a potentiometric sensor, inductive sensor, capacitive sensor, piezoelectric sensor, strain gauge sensor, variable reluctance sensor, and the like thereof. Sensor 112 may include one or more environmental sensors, which may function to sense parameters of the environment surrounding the aircraft. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 112 may include a geospatial sensor. Sensor 112 may be located outside the aircraft; and/or be included in and/or attached to at least a portion of the aircraft. Sensor 112 may include one or more proximity sensors, displacement sensors, vibration sensors, and the like thereof. Sensor 112 may be used to monitor the status of aircraft for both critical and non-critical functions. Sensor 112 may be incorporated into vehicle or aircraft or be remote. Sensor 112 is described further herein with reference to FIG. 2A.

Figure 2A:
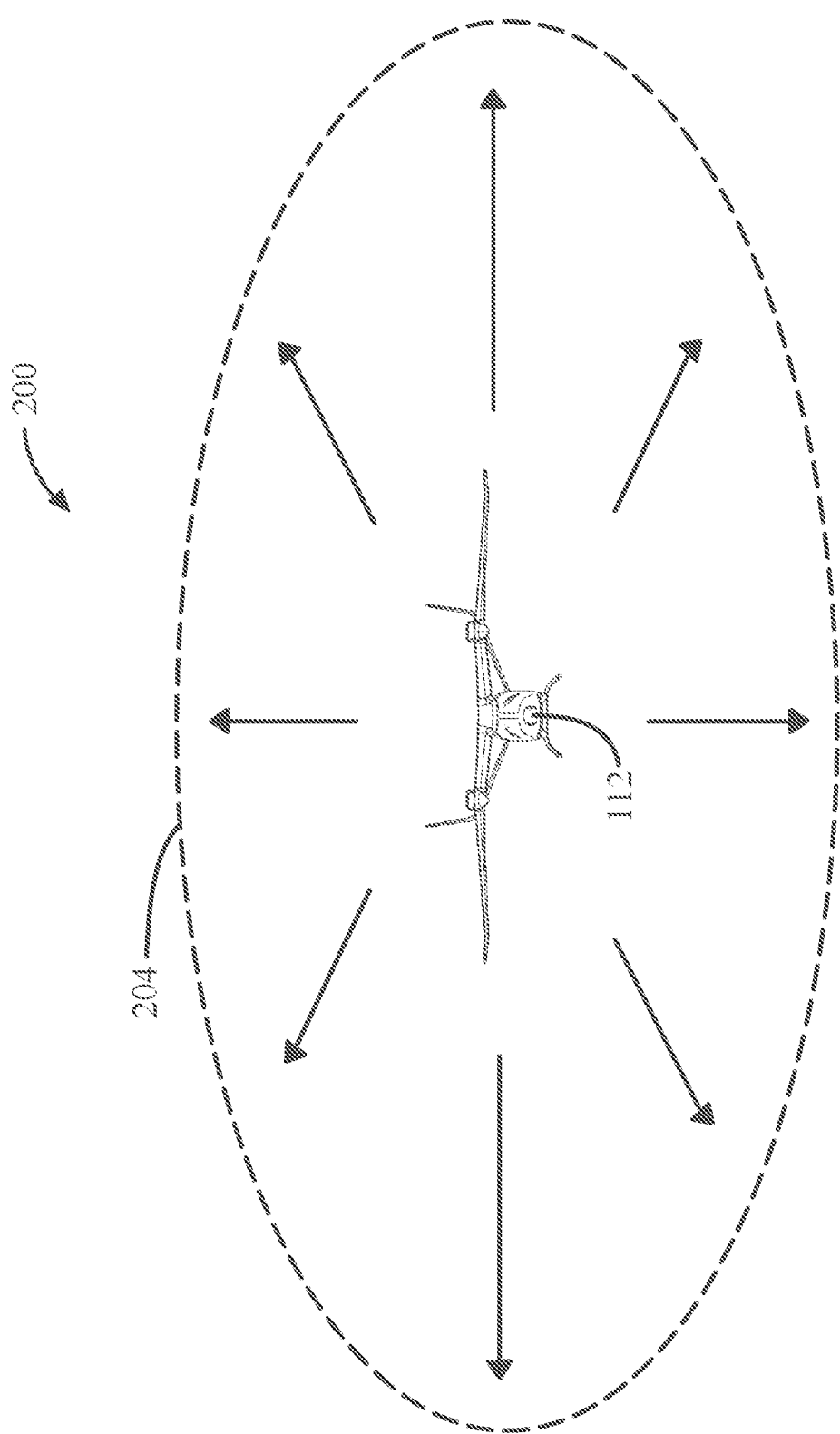
FIG. 2A is a diagrammatic representation of an exemplary embodiment of a side view of the cross-sectional area associated with the boundary of the flying space.

Now referring to FIG. 2A, system 200 illustrates a side view of cross-sectional area of boundary 204 associated with the three-dimensional flying space. Cross-sectional area of the boundary of the flying space may be an ellipse shape, like as shown, but could also be a rectangular shape, circular shape, or any shape therewith. System 200 includes aircraft 100, sensor 112, and boundary 204. As used in this disclosure, "boundary" is an invisible fence that limits the area that aircraft can fly in. As used in this disclosure, "three-dimensional flying space" is an area in which aircraft is allowed to fly in, either in real life or a flying simulation. Boundary 204 confines aircraft 100 to a specified flying area within the three-dimensional flying space. Boundary 204 is described further below.

Still referring to FIG. 2A, aircraft 100 includes sensor 112 may include an optical sensor. As used in this disclosure an "optical sensor" is an electronic device that alters any parameter of an electronic circuit when contacted by visible or NIR light. Optical detectors may include, without limitation, charge-coupled devices (CCD), photodiodes, avalanche photodiodes (APDs), silicon photo-multipliers (SiPMs), complementary metal-oxide-semiconductor (CMOS), scientific CMOS (sCMOS), micro-channel plates (MCPs), micro-channel plate photomultiplier tubes (MCP-PMTs), single photon avalanche diode (SPAD), Electron Bombarded Active Pixel Sensor (EBAPS), quanta image sensor (QIS), spatial phase imagers (SPI), quantum dot cameras, image intensification tubes, photovoltaic imagers, optical flow sensors and/or imagers, photoresistors and/or photosensitive or photon-detecting circuit elements, semiconductors and/or transducers. APDs, as used herein, are diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs may provide a built-in stage of gain through avalanche multiplication. When a reverse bias is less than breakdown voltage, a gain of an APD may be approximately linear. For silicon APDs this gain may be on the order of 10-100. Material of the APD may contribute to gains.

Still referring to FIG. 2A, optical sensor may be configured to identify a topographical datum. As used in this disclosure a "topographical datum" is an element of datum representing the arrangement and/or location of a physical feature of a geolocation. For example, and without limitation, topographical datum may include one or more elements of datum denoting a mountain range, skyscraper, river, ridge, ocean, lake, vehicle, animal, person, street, field, tree, and the like thereof. In an embodiment, and without limitation, optical sensor may include a light radar component. As used in this disclosure a "light radar component" is an active imaging source that transmits light toward an object or field of interest and detects back-scattered or reflected light, measuring time of flight (ToF), interferometry, and/or phase of such back-scattered and/or reflected light to compute distances to, velocities, and/or accelerations of objects at points from which back-scatter and/or reflection occurred. In an embodiment, the wavelength of light may be outside the range of visible light; for instance, and without limitation, wavelength may be in the infrared range as described above. Light radar component may include a "flash lidar" component, mechanical or non-mechanical beam steering, light patterns, and/or computational imaging methods, such as plenoptic or other multi-aperture embodiments. In an embodiment, and without limitation, light radar component may include one or more optical elements for focusing, collimating, and/or transmitting light emitted by light source. In an embodiment, intensity and/or focus may default to minimally harmful settings, permitting allowing ToF ranging or the like to determine a distance to a nearest topographical data point and/or ground point. Light radar component may include detectors that may be sensitive specifically to a narrow band of wavelengths transmitted by light source, and/or may be sensitive to a range of wavelengths that includes the band transmitted by the light source. Detectors may be designed to react quickly to initial detection of photons, for instance through use of APDs or other highly sensitive detectors.

In an embodiment, and still referring to FIG. 2A, optical sensor may be configured to calculate an in-air position as a function of the topographical datum. As used in this disclosure an "in-air position" is a relative location and/or orientation of an aircraft relative to the topographical datum. For example, and without limitation, optical sensor may perform a ToF calculation as a function of the one or more light radar components by firing pulses of light and measuring time required for a backscattered and/or reflected pulse to return. As a further non-limiting example, ToF may be used to measure a distance from light radar component to a point from which light is scattered; this may be used, without limitation, to detect distance to a topographical datum such as a building. Distance may be computed using a single reading of ToF, by averaging two or more ToF readings, and/or measuring multiple returns to reduce false readings from clutter. ToF may be used to detect edges of objects such as an edge of a cliff. ToF may be used to generate an image, for instance by repeatedly capturing readings of ToF to different portions of an object and/or topographical datum; a three-dimensional surface contour of the object, such as facial features, details of an object a person is holding, or the like, may be rendered using ToF data. ToF measurements may be processed to generate a depth map or point cloud, defined for purposes of this disclosure as a set of Z-coordinate values for every pixel of the image, which may be measured in units of millimeters, micrometers, or the like. Depth map data may be combined with other imaging data; for instance, intensity or phase values of pixels in an infrared reading may be measured as proportional to an amount of light returned from a scene.

Still referring to FIG. 2A, sensor 112 may include a ranging sensor. As used in this disclosure, a "ranging sensor" is an electronic device that receives, stores, and/or transmits one or more elements of spatial information. For example, and without limitation, ranging sensor may receive a temporal indicator. As used in this disclosure, a "temporal indicator" is an element of datum denoting a time and/or temporal element. For example, and without limitation, temporal indicator may include a time period, wherein a time period is a magnitude of time elapsed, such as but not limited to seconds, minutes, hours, days, weeks, months, years, and the like thereof. For example, and without limitation, temporal indicator may denote a time period that aircraft has been in flight and/or traveling in a medium, such as but not limited to air. As a further non-limiting example, temporal indicator may denote a time period that aircraft has been idling and/or stationary. As a further non-limiting example, temporal indicator may denote a time period that aircraft has been at a cruising altitude. As a further non-limiting example, temporal indicator may denote a time period that aircraft has been climbing and/or descending from a cruising altitude. As a further non-limiting example, temporal indicator may denote a time period that a motor has been expending energy. As a further non-limiting example, temporal indicator may denote a time period that a torque and/or thrust has been exerted by a flight component, wherein a flight component is described above in detail.

In an embodiment, and still referring to FIG. 2A, ranging sensor may be configured to calculate a distance as a function of the temporal indicator and the boundary. As used in this disclosure a "distance" is a measurement of travel and/or progress that has progressed. For example, and without limitation distance may denote a number of kilometers and/or miles that have been traveled. As a further non-limiting example, distance may denote a progression of distance traveled as a function of a required distance to be traveled. In an embodiment, distance may denote one or more replacement points. As used in this disclosure a "replacement point" is a distance and/or progression interval in which a component and/or aircraft has deteriorated. For example, and without limitation, replacement point may denote that an aircraft has 1200 km remaining prior to requiring maintenance. As a further non-limiting example, replacement point may denote that a flight component has 5% remaining prior to requiring a replacement component.

Still referring to FIG. 2A, sensor 112 detects an aircraft position. In this disclosure, "aircraft position" is the location of aircraft in terms of longitude and latitude. Data that contains the aircraft position is called aircraft location datum and is further described below in reference to FIG. 3.

Still referring to FIG. 2A, sensor 112 detects boundary information associated with the three-dimensional flying space. "Boundary information" contains the information concerning the exact location of the closest point on boundary 204 that is preprogrammed into the sensor. Data that contains the boundary information is called the boundary datum and is further described below in reference to FIG. 3.

Figure 2B:
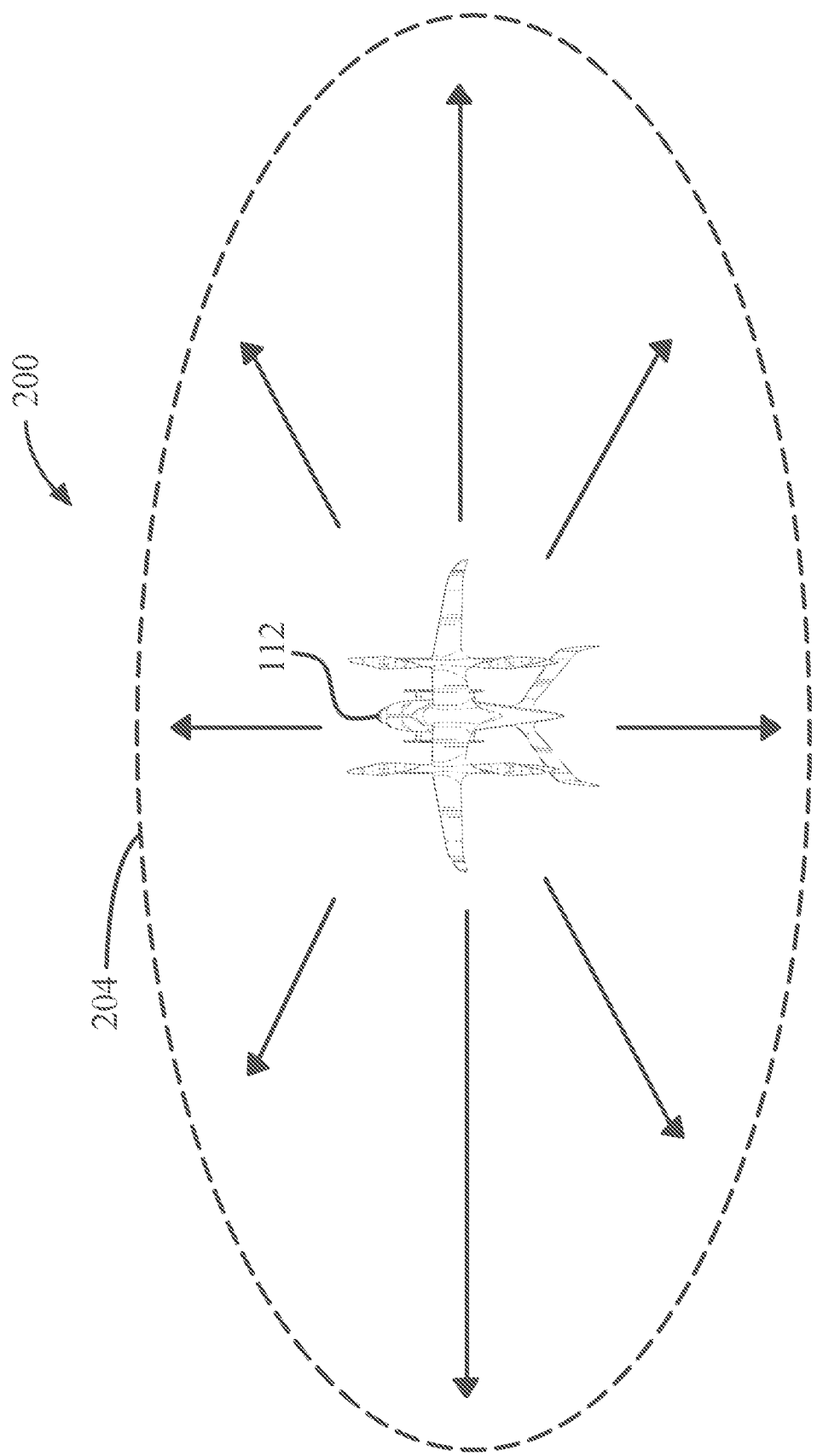
FIG. 2B is a diagrammatic representation of an exemplary embodiment of a top view of the cross-sectional area associated with the boundary of the flying space.

Now referring to FIG. 2B, system 200 illustrates a side view of cross-sectional area of boundary 204 associated with the three-dimensional flying space. Cross-sectional area of the boundary of the flying space may be an ellipse shape, like as shown, but could also be a rectangular shape, circular shape, or any shape therewith. System 200 includes aircraft 100, sensor 112, and boundary 204. All three are discussed further below in reference to FIG. 3. Everything as described before in reference to FIG. 2A is applicable to FIG. 2B as well.

Figure 3:
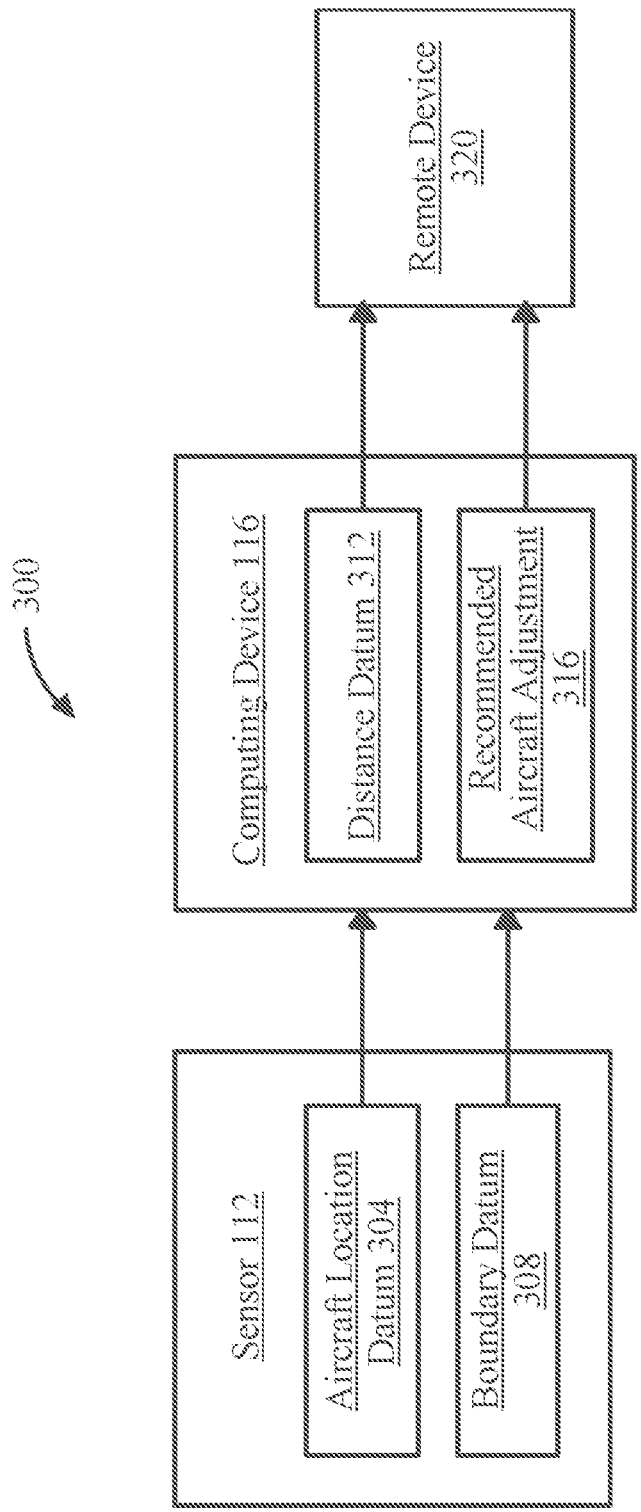
FIG. 3 is a block diagram of an exemplary embodiment of a system for determining boundaries in a simulation of an electric aircraft.

Now referring to FIG. 3, system 300 illustrates an exemplary embodiment of a system for determining boundaries in a simulation of an electric aircraft. System includes sensor 112, aircraft location datum 304, boundary datum 308, computing device 116, distance datum 312, recommended aircraft adjustment 316, and remote device 320.

Still referring to FIG. 3, system 300 includes a sensor 112 configured to detect an aircraft location datum 304 and boundary datum 308. As said earlier, "aircraft location datum" includes of information concerning aircraft's position. Aircraft location datum 304 may include a longitude datum and a latitude datum. For example, but without limitation, aircraft position could be latitude: 38.42964, longitude: 123.41508, or the like. As used in this disclosure, "boundary datum" contains position information about a single point on boundary, out of the plurality of infinite points that include boundary, that is closest to aircraft location datum. Boundary datum 308 is configured to include a longitude datum and a latitude datum that are pre-programmed into the sensor to represent the 3D flying space limit. An example, but without limitation, of a boundary datum may be latitude: 43.56724, longitude: 80.90365, which is programmed in the sensor to be located in on boundary and is the closest point on that boundary to whatever the longitude and latitude of aircraft position are.

Continuously referring to FIG. 3, sensor 112 is configured to transmit aircraft location datum 304 and boundary datum 308 to computing device 116. Computing device 116 may be a flight controller, tablet, smart phone, computer, or the like and is further described herein with reference to FIG. 7.

Still referring to FIG. 3, system 300 includes a computing device 116 configured to receive the datums from the sensor and determine a distance datum 312 as a function of transmit aircraft location datum 304 and boundary datum 308. In this disclosure, "distance datum" is the distance between aircraft location datum 304 and boundary datum 308. Distance datum 312 may be any length and measured in any type of metric system. Examples of distance datum 312 include, without limitation, 654 yards, 4.3 kilometers, 392 centimeters, or the like. See above description herein with reference to FIG. 2A, to see examples of how distance can be detected. Distance datum could also be just the subtraction difference between the longitude and latitude datums of aircraft location datum 304 and boundary datum 308.

Still referring to FIG. 3, computing device 116 is also configured to generate a recommended aircraft adjustment 316 as a function of distance datum 312. As used in this disclosure, "recommended aircraft adjustment" is an action of movement of an aircraft that is suggested to pilot from computing device. For example, but without limitation, computing device generate a recommendation of a 180-degree turn if the plane is traveling the wrong way. Other examples of aircraft adjustments may include straight-and-level flight, climbs, descents, lazy eights, turns, and the like. Aircraft adjustments may recommend pilot to follow a particular flight path, what to do next, where to move controls and the like. In this disclosure, "recommended adjustment" may refer to a specific action of flight for the pilot/autopilot to execute. For instance, but without limitation, examples of flight adjustments may include straight-and-level flight, turns, climbs, and descents. Recommended aircraft adjustment 316 also could just be to tell pilot to move away farther away from boundary.

Continuously referring to FIG. 3, computing device 116 transmits distance datum 312 and recommended aircraft adjustment 316 to a remote device 320. As used in this disclosure, "remote device" is any visual presentation of data. For example, but without limitation, distance datum 312 and recommended aircraft adjustment 316 may be shown through a sort of computer screen, VR goggles, a tablet, a phone, a gaming device or the like. Other examples may include various types of displays including but not limited to electroluminescent display (ELD), a liquid crystal display (LCD), a light-emitting diode (LED), a plasma display (PDP), and/or a quantum dot display (QLED). Other displays may include a head mounted display, a head-up display, a display incorporated in eyeglasses, googles, headsets, helmet display systems, or the like, a display incorporated in contact lenses, an eye tap display system including without limitation a laser eye tap device, VRD, or the like. When developing remote device 320, it is important to keep in mind that remote device 320 may need to be easily visually accessible by pilot. Remote device 320 may be part of sensor 112 or computing device 116 or be a completely separate entity in aircraft. Remote device 320 may also be a stereoscopic display, which may denote a display that simulates a user experience of viewing a three-dimensional space and/or object, for instance by simulating and/or replicating different perspectives of a user's two eyes; this is in contrast to a two-dimensional image, in which images presented to each eye are substantially identical, such as may occur when viewing a flat screen display. Stereoscopic display may display two flat images having different perspectives, each to only one eye, which may simulate the appearance of an object or space as seen from the perspective of that eye. Alternatively or additionally, stereoscopic display may include a three-dimensional display such as a holographic display or the like. Persons skilled in the art, upon reviewing the entirety of this disclosure, will be aware of various optical projection and/or remote device 320 technologies that may be incorporated in system 300 consistently with this disclosure.

Still referring to FIG. 3, computing device 320 may use a mesh network. Disclosure related to use of mesh network to communicate between computing device and aircraft includes U.S. patent application Ser. No. 17/348,916 entitled "METHODS AND SYSTEMS FOR SIMULATED OPERATION OF AN ELECTRIC VERTICAL TAKE-OFF AND LANDING (EVTOL) AIRCRAFT," incorporated herein by reference in its entirety.

Still referring to FIG. 3, remote device 320 receives datums from computing device 116 and displays distance datum 312 and recommended aircraft adjustment 316 to a user. Remote device 320 may notify the user of distance datum 312 and aircraft adjustment 316 through a visual and auditory alert. Examples of this are, but without limitation, a bell, a ringing noise, a flashing light, a change in color, or the like. Remote device also presents a speed limit associated with the three-dimension flying space. In this disclosure, "speed limit" is the maximum speed one can travel in a specific area, so inside the 3D flying space. Pilot will also be alerted if the speed limit has been exceeded. Notifications of this may be the same as above. Remote device 320 also alerts user if distance datum is below a distance threshold. In this disclosure, "distance threshold" is a specified distance between aircraft location and boundary; pilot may be notified if aircraft is too close to boundary. For example but without limitation, a red light near pilot might turn on if aircraft is within 100 feet of boundary.

Still referring to FIG. 3, remote device 320 is further configured to receive and transmit user interactions to the computing device. In this disclosure, a "user interaction" is when someone interacts with user interface, or in the case, remote device 320. Examples of user interactions can be, but are not limited to, silencing the alert, stopping flashing of lights, changing distance threshold, and the like. Computing device then receives user interaction and generates an updated recommended aircraft adjustment to be transmitted back to remote device 320. In this disclosure, "updated recommended aircraft adjustment" is aircraft adjustment after user has interacted with remote device 320. Further, a "user" in this disclosure is anyone interacting with the flight controls of the aircraft. Examples include but are not limited to a pilot, co-pilot, a pilot in a remote location, or a pilot simulator.

Figure 4:
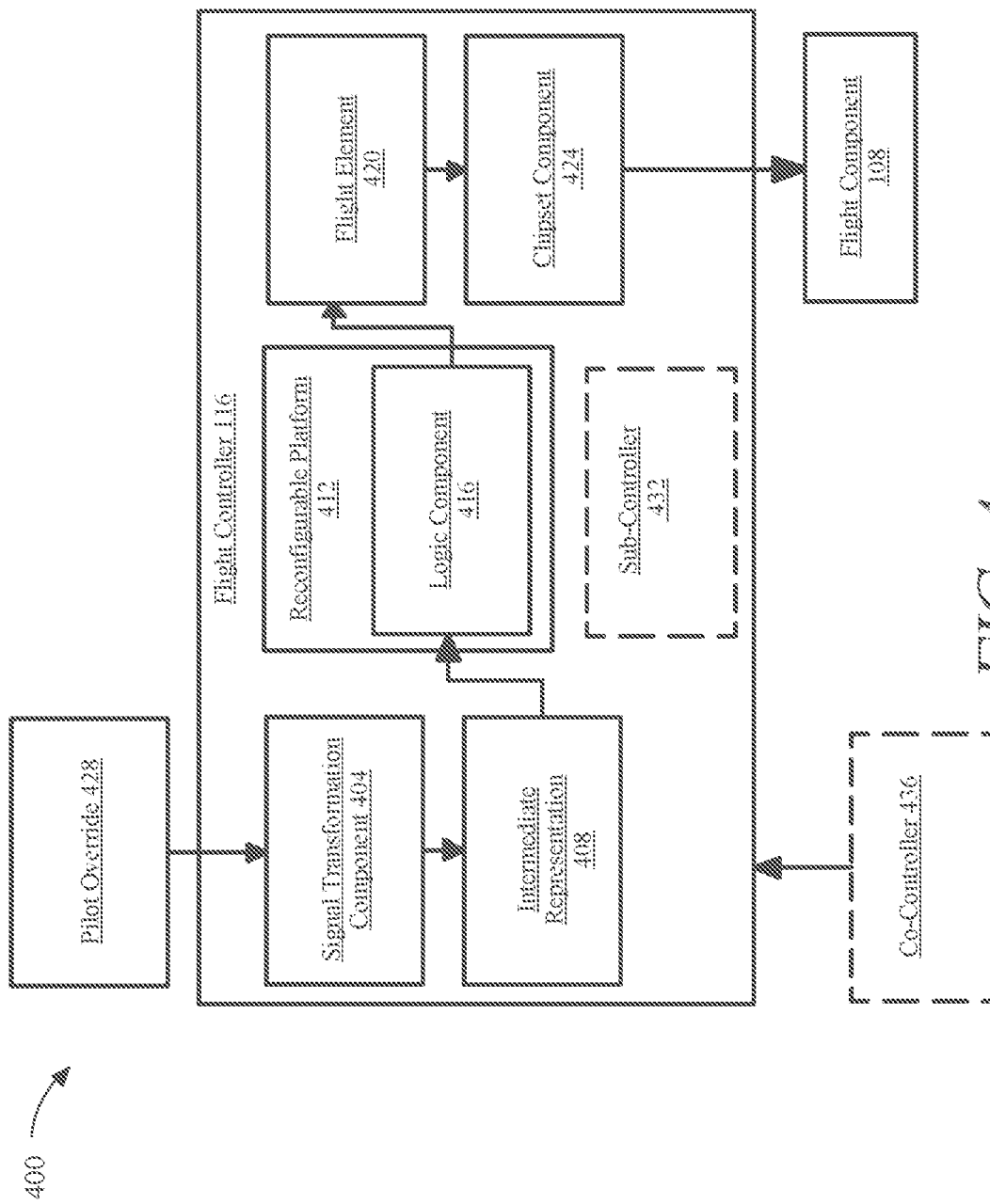
FIG. 4 is a block diagram of an exemplary embodiment of a flight controller.

Now referring to FIG. 4, an exemplary embodiment 400 of a possible computing device 116, a flight controller, is illustrated. As used in this disclosure a "flight controller" is a computing device of a plurality of computing devices dedicated to data storage, security, distribution of traffic for load balancing, and flight instruction. Flight controller may include and/or communicate with any computing device as described in this disclosure, including without limitation a microcontroller, microprocessor, digital signal processor (DSP) and/or system on a chip (SoC) as described in this disclosure. Further, flight controller may include a single computing device operating independently, or may include two or more computing device operating in concert, in parallel, sequentially or the like; two or more computing devices may be included together in a single computing device or in two or more computing devices. In embodiments, flight controller may be installed in an aircraft, may control aircraft remotely, and/or may include an element installed in the aircraft and a remote element in communication therewith.

In an embodiment, and still referring to FIG. 4, flight controller may include a signal transformation component 404. As used in this disclosure a "signal transformation component" is a component that transforms and/or converts a first signal to a second signal, wherein a signal may include one or more digital and/or analog signals. For example, and without limitation, signal transformation component 404 may be configured to perform one or more operations such as preprocessing, lexical analysis, parsing, semantic analysis, and the like thereof. In an embodiment, and without limitation, signal transformation component 404 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 404 may include transforming one or more low-level languages such as, but not limited to, machine languages and/or assembly languages. For example, and without limitation, signal transformation component 404 may include transforming a binary language signal to an assembly language signal. In an embodiment, and without limitation, signal transformation component 404 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 404 may be configured to optimize an intermediate representation 408. As used in this disclosure an "intermediate representation" is a data structure and/or code that represents the input signal. Signal transformation component 404 may optimize intermediate representation as a function of a data-flow analysis, dependence analysis, alias analysis, pointer analysis, escape analysis, and the like thereof. In an embodiment, and without limitation, signal transformation component 404 may optimize intermediate representation 408 as a function of one or more inline expansions, dead code eliminations, constant propagation, loop transformations, and/or automatic parallelization functions. In another embodiment, signal transformation component 404 may optimize intermediate representation as a function of a machine dependent optimization such as a peephole optimization, wherein a peephole optimization may rewrite short sequences of code into more efficient sequences of code. Signal transformation component 404 may optimize intermediate representation to generate an output language, wherein an "output language," as used herein, is the native machine language of flight controller 116. For example, and without limitation, native machine language may include one or more binary and/or numerical languages.

In an embodiment, and without limitation, signal transformation component 404 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller may include a reconfigurable hardware platform 412. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 412 may be reconfigured to enact any algorithm and/or algorithm selection process received from another computing device and/or created using machine-learning processes.

Still referring to FIG. 4, reconfigurable hardware platform 412 may include a logic component 416. As used in this disclosure a "logic component" is a component that executes instructions on output language. For example, and without limitation, logic component may perform basic arithmetic, logic, controlling, input/output operations, and the like thereof. Logic component 416 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 416 may be organized according to Von Neumann and/or Harvard architecture as a non-limiting example. Logic component 416 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 416 may include one or more integrated circuit microprocessors, which may contain one or more central processing units, central processors, and/or main processors, on a single metal-oxide-semiconductor chip. Logic component 416 may be configured to execute a sequence of stored instructions to be performed on the output language and/or intermediate representation 408. Logic component 416 may be configured to fetch and/or retrieve instruction from a memory cache, wherein a "memory cache," as used in this disclosure, is a stored instruction set on flight controller. Logic component 416 may be configured to decode instruction retrieved from memory cache to opcodes and/or operands. Logic component 416 may be configured to execute instruction on intermediate representation 408 and/or output language. For example, and without limitation, logic component 416 may be configured to execute an addition operation on intermediate representation 408 and/or output language.

In an embodiment, and without limitation, logic component 416 may be configured to calculate a flight element 420. As used in this disclosure a "flight element" is an element of datum denoting a relative status of aircraft. For example, and without limitation, flight element 420 may denote one or more torques, thrusts, airspeed velocities, forces, altitudes, groundspeed velocities, directions during flight, directions facing, forces, orientations, and the like thereof. For example, and without limitation, flight element 420 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 420 may denote that aircraft is following a flight path accurately and/or sufficiently.

Still referring to FIG. 4, flight controller may include a chipset component 424. As used in this disclosure a "chipset component" is a component that manages data flow. In an embodiment, and without limitation, chipset component 424 may include a northbridge data flow path, wherein northbridge dataflow path may manage data flow from logic component 416 to a high-speed device and/or component, such as a RAM, graphics controller, and the like thereof. In another embodiment, and without limitation, chipset component 424 may include a southbridge data flow path, wherein southbridge dataflow path may manage data flow from logic component 416 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 424 may manage data flow between logic component 416, memory cache, and a flight component 108. As used in this disclosure a "flight component" is a portion of an aircraft that can be moved or adjusted to affect one or more flight elements. For example, flight component 108 may include a component used to affect aircrafts' roll and pitch which may include one or more ailerons. As a further example, flight component 108 may include a rudder to control yaw of an aircraft. In an embodiment, chipset component 424 may be configured to communicate with a plurality of flight components as a function of flight element 420. For example, and without limitation, chipset component 424 may transmit to an aircraft rotor to reduce torque of a first lift propulsor and increase the forward thrust produced by a pusher component to perform a flight maneuver.

In an embodiment, and still referring to FIG. 4, flight controller is configured generate an autonomous function. As used in this disclosure an "autonomous function" is a mode and/or function of flight controller that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 420. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller will adjust aircraft. As used in this disclosure a "semi-autonomous mode" is a mode that automatically adjusts and/or controls a portion and/or section of aircraft.

In an embodiment, and still referring to FIG. 4, flight controller generates autonomous function as a function of an autonomous machine-learning model. As used in this disclosure an "autonomous machine-learning model" is a machine-learning model to produce an autonomous function output given flight element 420 and pilot override 428 as inputs; this is in contrast to a non-machine learning software program where the commands to be executed are determined in advance by a user and written in a programming language.

As used in this disclosure a "pilot override switch" is an element of datum representing one or more functions a pilot does to claim flight control of aircraft 100. For example, pilot override 428 may denote that a pilot is gaining control and/or maneuvering ailerons, rudders and/or propulsors. In an embodiment, pilot override 428 must include an implicit signal and/or an explicit signal. For example, and without limitation, pilot override 428 may include an explicit signal, wherein pilot explicitly states desire for control. As a further non-limiting example, pilot override 428 may include an explicit signal directing flight controller to control and/or maintain entire aircraft, and/or entire flight plan. As a further non-limiting example, pilot override 428 may include an implicit signal, wherein flight controller detects a malfunction, torque alteration, flight path deviation, and the like thereof. In an embodiment, and without limitation, pilot override 428 may include one or more explicit signals to reduce torque, and/or one or more implicit signals that torque may be reduced due to reduction of airspeed velocity. In an embodiment, and without limitation, pilot override 428 may include one or more local and/or global signals. For example, and without limitation, pilot override 428 may include a local signal that is transmitted by a pilot and/or crew member. As a further non-limiting example, pilot override 428 may include a global signal that is transmitted by air traffic control and/or one or more remote users that are in communication with pilot of aircraft.

Still referring to FIG. 4, autonomous machine-learning model may include one or more autonomous machine-learning processes such as supervised, unsupervised, or reinforcement machine-learning processes that flight controller and/or a remote device may or may not use in the generation of autonomous function. As used in this disclosure "remote device" is an external device to flight controller. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elastic net regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that may include a semi-autonomous mode to increase thrust of propulsors. Autonomous training data may be received as a function of user-entered valuations of flight elements, pilot signals, simulation data, and/or autonomous functions. Flight controller may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot override, and/or simulation data to an autonomous function. Autonomous training data may be received in the form of one or more user-entered correlations of a flight element, pilot override, and/or simulation data to an autonomous function.

Still referring to FIG. 4, flight controller may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor, and the like thereof. Remote device and/or FPGA may perform autonomous machine-learning process using autonomous training data to generate autonomous function and transmit output to flight controller. Remote device and/or FPGA may transmit a signal, bit, datum, or parameter to flight controller that at least relates to autonomous function. Additionally or alternatively, remote device and/or FPGA may provide an updated machine-learning model. For example, and without limitation, an updated machine-learning model may be included of a firmware update, a software update, an autonomous machine-learning process correction, and the like thereof. As a non-limiting example, a software update may incorporate a new simulation data that relates to a modified flight element. Additionally or alternatively, the updated machine learning model may be transmitted to remote device and/or FPGA, wherein remote device and/or FPGA may replace autonomous machine-learning model with updated machine-learning model and generate the autonomous function as a function of flight element, pilot override, and/or simulation data using the updated machine-learning model. Updated machine-learning model may be transmitted by remote device and/or FPGA and received by flight controller as a software update, firmware update, or corrected autonomous machine-learning model. For example, and without limitation autonomous machine learning model may utilize a neural net machine-learning process, wherein updated machine-learning model may incorporate a gradient boosting machine-learning process.

Still referring to FIG. 4, flight controller may include, be included in, and/or communicate with a mobile device such as a mobile telephone or smartphone. Further, flight controller may communicate with one or more additional devices as described below in further detail via a network interface device. Network interface device may be utilized for commutatively connecting a flight controller to one or more of a variety of networks, and one or more devices. Examples of a network interface device may include, but are not limited to, a network interface card (e.g., a mobile network interface card, a LAN card), a modem, and any combination thereof. Examples of a network may include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. Network may include any network topology and can may employ a wired and/or a wireless mode of communication.

In an embodiment, and still referring to FIG. 4, flight controller may include, but is not limited to, for example, a cluster of flight controllers in a first location and a second flight controller or cluster of flight controllers in a second location. Flight controller may include one or more flight controllers dedicated to data storage, security, distribution of traffic for load balancing, and the like. Flight controller may be configured to distribute one or more computing tasks as described below across a plurality of flight controllers, which may operate in parallel, in series, redundantly, or in any other manner used for distribution of tasks or memory between computing devices. For example, and without limitation, flight controller may implement a control algorithm to distribute and/or command plurality of flight controllers. As used in this disclosure a "control algorithm" is a finite sequence of well-defined computer implementable instructions that may determine flight component of plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. For example, and without limitation, optimized signal communication may include identifying the discrete timing required to transmit and/or receive one or more segmentation boundaries. In an embodiment, and without limitation, creating optimized signal communication further includes separating a plurality of signal codes across plurality of flight controllers. For example, and without limitation, plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, plurality of flight controllers may include a chain path, wherein a "chain path," as used herein, is a linear communication path comprising a hierarchy that data may flow through. In an embodiment, and without limitation, plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 116. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or master bus controller. In an embodiment, master bus controller may be configured to perform bus arbitration. As used in this disclosure "bus arbitration" is method and/or scheme to prevent multiple buses from attempting to communicate with and/or connect to master bus controller. For example, and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 408 and/or output language from logic component 416, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between plurality of flight controllers. For example, and without limitation, priority packet may denote that a section of control algorithm should be used and/or is of greater priority than other sections.

Still referring to FIG. 4, flight controller may also be implemented using a "shared nothing" architecture in which data is cached at the worker, in an embodiment, this may enable scalability of aircraft and/or computing device. Flight controller may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to input nodes, a suitable training algorithm (such as Levenberg-Marquardt, conjugate gradient, simulated annealing, or other algorithms) is then used to adjust connections and weights between nodes in adjacent layers of neural network to produce the desired values at output nodes. This process is sometimes referred to as deep learning.

Still referring to FIG. 4, a node may include, without limitation a plurality of inputs $x_i$ that may receive numerical values from inputs to a neural network containing node and/or from other nodes. Node may perform a weighted sum of inputs using weights $w_i$ that are multiplied by respective inputs $x_i$. Additionally or alternatively, a bias b may be added to the weighted sum of inputs such that an offset is added to each unit in neural network layer that is independent of input to the layer. Weighted sum may then be input into a function φ, which may generate one or more outputs y. Weight $w_i$ applied to an input $x_i$ may indicate whether input is "excitatory," indicating that it has strong influence on one or more outputs y, for instance by the corresponding weight having a large numerical value, and/or a "inhibitory," indicating it has a weak effect influence on one more inputs y, for instance by the corresponding weight having a small numerical value. Values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 432. As used in this disclosure a "sub-controller" is a controller and/or component that is part of a distributed controller as described above; for instance, flight controller may be and/or include a distributed flight controller made up of one or more sub-controllers. For example, and without limitation, sub-controller 432 may include any controllers and/or components thereof that are similar to distributed flight controller and/or flight controller as described above. Sub-controller 432 may include any component of any flight controller as described above. Sub-controller 432 may be implemented in any manner suitable for implementation of a flight controller as described above. As a further non-limiting example, sub-controller 432 may include one or more processors, logic components and/or computing devices capable of receiving, processing, and/or transmitting data across distributed flight controller as described above. As a further non-limiting example, sub-controller 432 may include a controller that receives a signal from a first flight controller and/or first distributed flight controller component and transmits signal to a plurality of additional sub-controllers and/or flight components.

Still referring to FIG. 4, flight controller may include a co-controller 436. As used in this disclosure a "co-controller" is a controller and/or component that joins flight controller as components and/or nodes of a distributer flight controller as described above. For example, and without limitation, co-controller 436 may include one or more controllers and/or components that are similar to flight controller. As a further non-limiting example, co-controller 436 may include any controller and/or component that joins flight controller to distributer flight controller. As a further non-limiting example, co-controller 436 may include one or more processors, logic components and/or computing devices capable of receiving, processing, and/or transmitting data to and/or from flight controller to distributed flight control system. Co-controller 436 may include any component of any flight controller as described above. Co-controller 436 may be implemented in any manner suitable for implementation of a flight controller as described above.

In an embodiment, and with continued reference to FIG. 4, flight controller may be designed and/or configured to perform any method, method step, or sequence of method steps in any embodiment described in this disclosure, in any order and with any degree of repetition. For instance, flight controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing entirety of this disclosure, will be aware of various ways in which steps, sequences of steps, processing tasks, and/or data may be subdivided, shared, or otherwise dealt with using iteration, recursion, and/or parallel processing.

Figure 5:
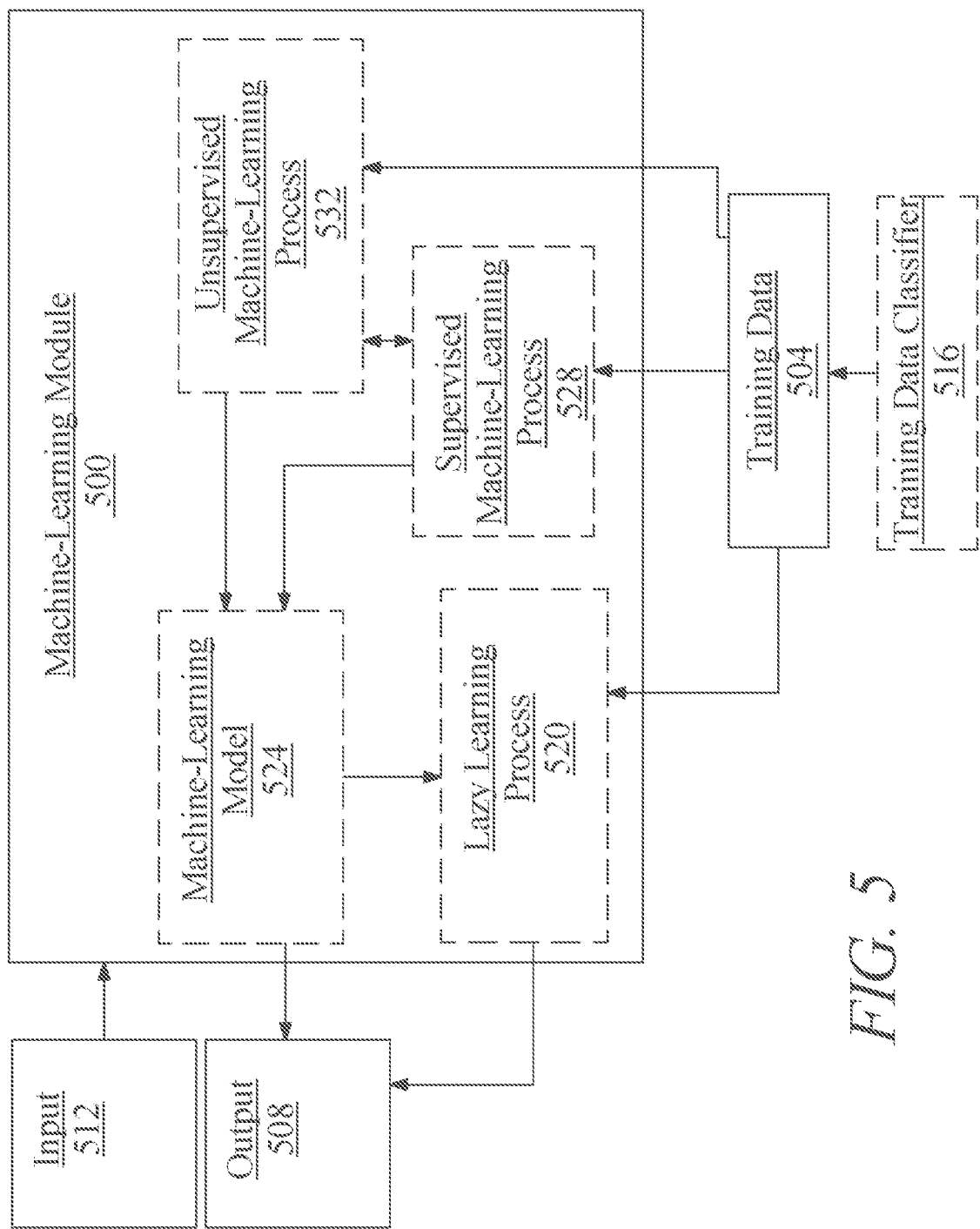
FIG. 5 is a block diagram of an exemplary embodiment of a machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output is an autonomous function.

Further referring to FIG. 5, training data may be filtered, sorted, and/or selected using one or more supervised and/or unsupervised machine-learning processes and/or models as described in further detail below; such models may include without limitation a training data classifier Training data classifier may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a process whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 412 may classify elements of training data to sub-categories of flight elements such as torques, forces, thrusts, directions, and the like thereof.

Still referring to FIG. 5, machine-learning module 500 may be configured to perform a lazy-learning process 512 and/or protocol, which may alternatively be referred to as a "lazy loading" or "call-when-needed" process and/or protocol, may be a process whereby machine learning is conducted upon receipt of an input to be converted to an output, by combining input and training set to derive the algorithm to be used to produce output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via process of "training" the network, in which elements from a training data 504 set are applied to input nodes, a suitable training algorithm (such as Levenberg-Marquardt, conjugate gradient, simulated annealing, or other algorithms) is then used to adjust connections and weights between nodes in adjacent layers of neural network to produce desired values at output nodes. This process is sometimes referred to as deep learning.

Still referring to FIG. 5, machine-learning algorithms may include at least a supervised machine-learning process 528. At least a supervised machine-learning process 528, as defined herein, may include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of resulting linear equation may be modified to improve minimization. Linear regression models may include ridge regression methods, where the function to be minimized may include the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
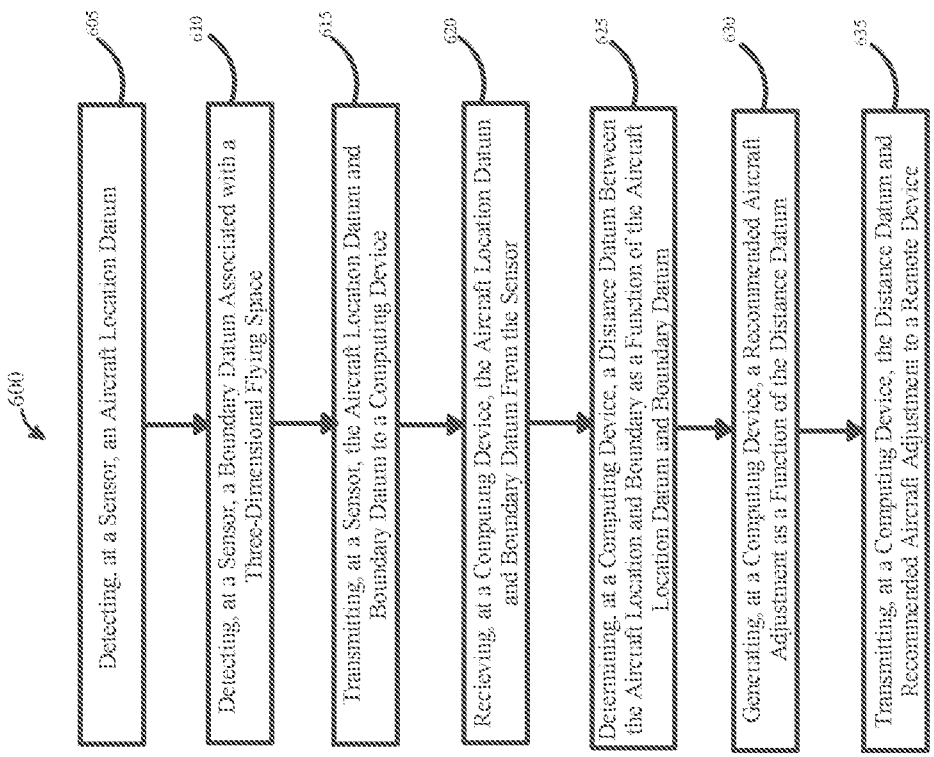
FIG. 6 is a flow diagram of an exemplary embodiment of a method for determining boundaries in a simulation of an electric aircraft.

Now referring to FIG. 6, an exemplary embodiment of method 600 for determining distance in a simulation of an electric aircraft. The electric aircraft may include, without limitation, any of the aircraft as disclosed herein and described above with reference to at least FIG. 1, including an eVTOL aircraft.

Still referring to FIG. 6, at step 605, an aircraft location datum 304 is detected by sensor 112. The sensor includes but is not limited to optical, ranging, environment sensors, or the like. Aircraft location datum 304 may include a longitude and latitude datum. The aircraft location datum may be any one of the datums as disclosed herein and described above with reference to at least FIGS. 2-3. The sensor may be any of the sensors as disclosed herein and described above with reference to at least FIGS. 1-3.

Still referring to FIG. 6, at step 610, a boundary datum 308 is detected by sensor 112. Boundary datum may be, without limitation, any latitude or longitudinal coordinates prep-programmed in the sensor to be on the boundary. The boundary cross-sectional area may be ellipse. The boundary datum may be any one of the datums as disclosed herein and described above with reference to at least FIGS. 2-3. The sensor may be any of the sensors as disclosed herein and described above with reference to at least FIGS. 1-3.

Still referring to FIG. 6, at step 615, the aircraft location datum 304 and boundary datum 308 are transmitted to computing device 116. Computing device 116 may be any type of flight controller, tablet, smart phone, computer, or the like. The aircraft location datum may be any one of the datums as disclosed herein and described above with reference to at least FIGS. 2-3. The boundary datum may be any one of the datums as disclosed herein and described above with reference to at least FIGS. 2-3. The computing device may be any of the devices as disclosed and described above with reference to at least FIGS. 1-3.

Still referring to FIG. 6, at step 620, the aircraft location datum 304 and boundary datum 308 are received by computing device 116. The aircraft location datum may be any one of the datums as disclosed herein and described above with reference to at least FIGS. 2-3. The boundary datum may be any one of the datums as disclosed herein and described above with reference to at least FIGS. 2-3. The computing device may be any of the devices as disclosed herein and described above with reference to at least FIGS. 1-3.

Still referring to FIG. 6, at step 625, a distance datum 316 between the aircraft location and boundary is determined by the computing device 116 as a function of the aircraft location datum 304 and boundary datum 308. Distance datum may be, without limitation, any measurement like 300 feet, 1.2 kilometers, 0.67 miles, 588 yards, or the like. The distance datum may be any one of the datums as disclosed herein and described above with reference to at least FIG. 3. The aircraft location datum may be any one of the datums as disclosed herein and described above with reference to at least FIGS. 2-3. The boundary datum may be any one of the datums as disclosed herein and described above with reference to at least FIGS. 2-3. The computing device may be any of the devices as disclosed herein and described above with reference to at least FIGS. 1-3.

Still referring to FIG. 6, at step 630, a recommended aircraft adjustment 316 is generated at the computing device 116 as a function of the distance datum 312. Recommended aircraft adjustment may be, without limitation: move left, make a turn, change direction 34 degrees east, turn around, or the like. The recommended aircraft adjustment may be any one of the adjustments as disclosed herein and described above with reference to at least FIG. 3. The distance datum may be any one of the datums as disclosed herein and described above with reference to at least FIG. 3. The computing device may be any of the devices as disclosed herein and described above with reference to at least FIGS. 1-3.

Still referring to FIG. 6, at step 635, the recommended aircraft adjustment and distance datum are transmitted, at a computing device 112, to remote device 320. Remote device 320 may be, without limitation, VR goggles, tablet, computer, pilot display, or the like. The remote device further presents a speed limit associated with the three-dimensional flying space. Remote device 320 further presents a permitted direction of flight associated with the three-dimensional flying space. The remote device is configured to alert the user if the distance datum is below a distance threshold. Examples of a user may be a pilot, a simulation, a pilot in a remote setting, or the like. The remote device tells the user the distance datum and recommended aircraft adjustment through a visual and auditory alert. The remote device is further configured to receive a user interaction and transmit it to the computing device. The recommended aircraft adjustment may be any one of the adjustments as disclosed herein and described above with reference to at least FIG. 3. The distance datum may be any one of the datums as disclosed herein and described above with reference to at least FIG. 3. The computing device may be any of the devices as disclosed herein and described above with reference to at least FIGS. 1-3. The remote device may be any of the devices as disclosed herein and described above with reference to at least FIG. 3.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium may include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, may include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device may include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
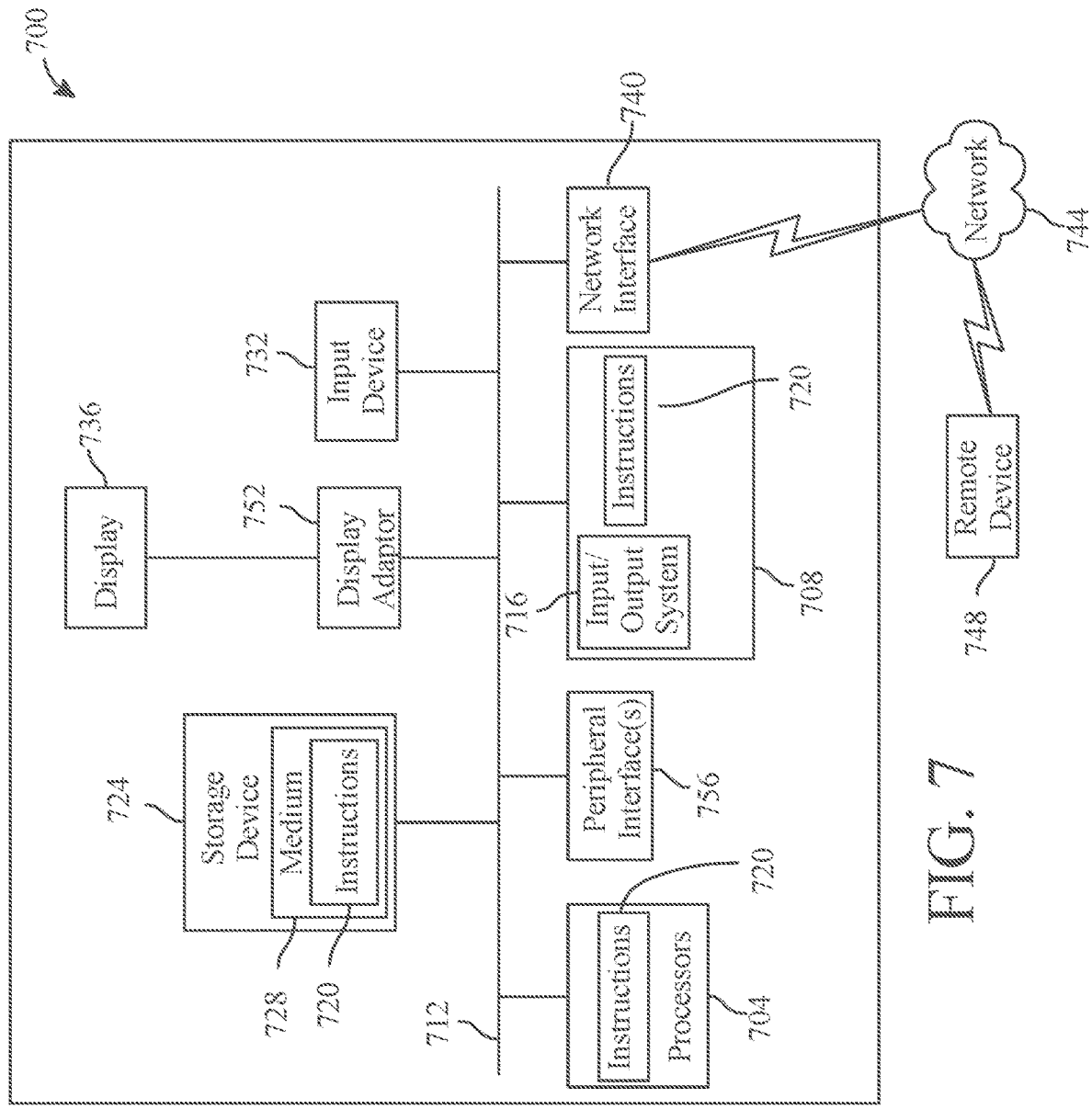
FIG. 7 is a block diagram of a computing system that can be used to implement any one or more of the methodologies disclosed herein and any one or more portions thereof.

FIG. 7 shows a diagrammatic representation of one embodiment of a computing device in exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 may include a processor 704 and a memory 708 that communicate with each other, and with other components, via a bus 428432. Bus 428432 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 428432 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown 208. Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 428432 via any of a variety of interfaces (not shown) including, but not limited to, a serial interface, a parallel interface, a game port, a USB interface, a FIREWIRE interface, a direct interface to bus 428432, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 708 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 428432 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for defining boundaries of a simulation of an electric aircraft, the system comprising:
   at least a ranging sensor, wherein the at least a ranging sensor is configured to:
      detect an aircraft location datum of a manned electric aircraft;
      receive a temporal indicator;
      detect a boundary datum associated with a three-dimensional flying space, the detecting of the boundary datum comprising:
         determining a closest point of a plurality of points on a boundary based on the aircraft location datum; and
         detecting the boundary datum as a function of the closest point of the boundary; and
      transmit the aircraft location datum, the temporal indicator and the boundary datum to a computing device; and
   the computing device, wherein the computing device is configured to:
      receive the aircraft location datum, the temporal indicator and the boundary datum from the sensor;
      determine a distance datum between the aircraft location and the boundary as a function of the aircraft location datum, the temporal indicator and the boundary datum, wherein the distance datum comprises at least a replacement point;
      generate a recommended aircraft adjustment as a function of the distance datum; and
      transmit the distance datum and recommended aircraft adjustment to a stereoscopic display.

2. The system of claim 1, wherein the aircraft location datum includes:
   a longitude datum; and
   a latitude datum.

3. The system of claim 1, wherein the three-dimensional flying space has an elliptical cross section.

4. The system of claim 1, wherein the boundary datum is configured to include a longitude datum and a latitude datum that are pre-programmed into the computing device to represent the 3D flying space.

5. The system of claim 1, wherein the remote device further presents a speed limit associated with the three-dimensional flying space.

6. The system of claim 1, wherein the remote device further presents a permitted direction of flight associated with the three-dimensional flying space.

7. The system of claim 1, wherein the remote device tells the user the distance datum and recommended aircraft adjustment through a visual and auditory alert.

8. The system of claim 1, wherein the remote device is further configured to:
   receive a user interaction; and
   transmit the user interaction to the computing device.

9. The system of claim 8, wherein the computing device is further configured to:
   receive the user interaction from the remote device;
   generate an updated recommended aircraft adjustment as a function of the user interaction; and
   transmit the updated recommended aircraft adjustment to the remote device.

10. The system of claim 1, wherein the remote device is configured to alert the user if the distance datum is below a distance threshold.

11. A method for defining boundaries of a simulation of an electric aircraft, the method comprising:
    detecting, at at least a ranging sensor, an aircraft location datum of a manned aircraft;
    receiving, at the at least a ranging sensor, a temporal indicator;
    detecting, at the at least a ranging sensor, a boundary datum associated with a three-dimensional flying space for the aircraft, the detecting of the boundary datum comprising:
       determining a closest point of a plurality of points on a boundary based on the aircraft location datum; and
       detecting the boundary datum as a function of the closest point of the boundary;
    transmitting, at the at least a ranging sensor, the aircraft location datum, the temporal indicator and the boundary datum to a flight controller;

receiving, at the flight controller, the aircraft location datum the temporal indicator and the boundary datum from the at least a ranging sensor;

determining, at the flight controller, a distance datum between the aircraft location and boundary as a function of the aircraft location datum, the temporal indicator and the boundary datum, wherein the distance datum comprises at least a replacement point;

generating, at the flight controller, a recommended aircraft adjustment as a function of the distance datum; and transmitting, at the flight controller, the distance datum and recommended aircraft adjustment to a stereoscopic display.

12. The method of claim 11, wherein the aircraft location datum is configured to include:
a longitude datum; and
a latitude datum.

13. The method of claim 11, wherein the three-dimensional flying space has an elliptical cross section.

14. The method of claim 11, wherein the boundary datum is configured to include a longitude datum and a latitude datum that are pre-programmed into the computing device to represent the 3D flying space.

15. The method of claim 11, wherein the remote device further presents a speed limit associated with the three-dimensional flying space.

16. The method of claim 11, wherein the remote device further presents a permitted direction of flight associated with the three-dimensional flying space.

17. The method of claim 11, wherein the remote device tells the user the distance datum and recommended aircraft adjustment through a visual and auditory alert.

18. The method of claim 11, wherein the remote device is further configured to:
receive a user interaction; and
transmit the user interaction to the computing device.

19. The method of claim 18, wherein the computing device is further configured to:
receive the user interaction from the remote device;
generate an updated recommended aircraft adjustment as a function of the user interaction; and
transmit the updated recommended aircraft adjustment to the remote device.

20. The method of claim 11, wherein the remote device is configured to alert the user if the distance datum is below a distance threshold.

* * * * *